US008654910B1

(12) United States Patent
Lee et al.

(10) Patent No.: US 8,654,910 B1
(45) Date of Patent: Feb. 18, 2014

(54) CO-CHANNEL INTERFERENCE CANCELLATION WITH MULTIPLE RECEIVE ANTENNAS FOR BICM

(75) Inventors: Jungwon Lee, Cupertino, CA (US);
Rohit U. Nabar, Sunnyvale, CA (US);
Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/570,750

(22) Filed: Aug. 9, 2012

Related U.S. Application Data

(63) Continuation of application No. 12/171,790, filed on Jul. 11, 2008, now Pat. No. 8,243,860.

(60) Provisional application No. 60/950,425, filed on Jul. 18, 2007.

(51) Int. Cl.
*H03D 1/04* (2006.01)

(52) U.S. Cl.
USPC ............................................ 375/346; 375/316

(58) Field of Classification Search
USPC .................................................. 375/346, 316
See application file for complete search history.

(56) References Cited

U.S. PATENT DOCUMENTS

| 5,619,503 A * | 4/1997 | Dent ............................. 370/330 |
| 7,184,703 B1 * | 2/2007 | Naden et al. .................... 455/10 |
| 7,453,959 B2 | 11/2008 | Kim et al. |
| 7,474,640 B2 | 1/2009 | Doron et al. |
| 7,653,153 B2 | 1/2010 | Tosato et al. |
| 2006/0188031 A1 * | 8/2006 | Liu .............................. 375/260 |
| 2008/0056396 A1 * | 3/2008 | Li ............................... 375/260 |
| 2009/0016456 A1 * | 1/2009 | Li et al. ......................... 375/260 |

FOREIGN PATENT DOCUMENTS

| WO | WO 2006/034020 | 3/2006 |
| WO | WO 2007/038531 | 4/2007 |

OTHER PUBLICATIONS

Heath Jr., "Antenna Selection for Spatial Multiplexing Systems Based on Minimum Error Rate", 2001, IEEE.*
Javaudin, Jean-Philippe et al. "On Inter-Cell Interference in OFDMA Wireless Systems" Proceedings of the European Signal Processing Conference pp. 1-4, (Sep. 9, 2005).
Kettunen, Kimmo et al. "Iterative Multiuser Receiver Utilizing Soft Decoding Information" Proceedings of the IEEE International Conference on Communications pp. 942-946 (Jun. 6, 1999).
Wubben, D. et al. "Efficient algorithm for decoding layered space-time codes" Electronics Letters vol. 37 No. 22 pp. 1348-1350 (Oct. 25, 2001).

* cited by examiner

*Primary Examiner* — Michael Neff

(57) ABSTRACT

Apparatus and methods are provided for computing soft information at a receiver having a plurality of receive antennas. The receiver may be a mobile station or a base station, and can receive a signal vector that includes an intended signal from a first source as well as interfering signals from one or more other, interfering sources. The receiver can determine modulation information, such as the modulation scheme, used by each of the interfering sources. The mobile station can also estimate channel information, such as channel gain information, associated with each interfering source. Using the modulation and channel information, the receiver can compute soft information, such as a log-likelihood ratio. In some embodiments, the receiver can adaptively determine which interference sources and which receive antennas to use when computing the soft information.

18 Claims, 8 Drawing Sheets

CO-CHANNEL INTERFERENCE CANCELLATION WITH MULTIPLE RECEIVE ANTENNAS FOR BICM

CROSS-REFERENCE TO RELATED APPLICATIONS

This application is a continuation of U.S. patent application Ser. No. 12/171,790, filed Jul. 11, 2008, (currently pending), which claims the benefit under 35 U.S.C. §119(e) of U.S. Provisional Application No. 60/950,425, filed Jul. 18, 2007. This is also related to U.S. patent application Ser. No. 12/119,264, filed May 12, 2008. These prior applications are hereby incorporated by reference herein in their entirety.

BACKGROUND OF THE DISCLOSURE

The disclosed technology relates generally to decoding received signals, and more particular to computing soft information for signals received from an intended source in the presence of interference from other sources.

There are several known wireless protocols for cellular and Internet systems. These wireless protocols attempt to provide high transmission reliability to wireless users, such as cellular telephone users, to prevent dropped telephone calls or poor voice transmissions. For example, to reduce the effect of interfering signals, the Global Systems for Mobile communications ("GSM") protocol decomposes the frequency band allocated for cellular communication into seven frequency channels. This allows a cellular telephone to tune into only the appropriate channel to avoid interfering signals that are transmitted through the other six channels. However, such a communications technique forces data transmission to occur at a fraction of the maximum possible bandwidth. Reducing the bandwidth in this manner limits the maximum data rate that can be achieved by a communications network.

For conventional systems that utilize multiple receive antennas, interference cancellation is attempted by using matched filtering or linear equalization, such as zero-forcing or minimum-mean squared error equalization. Such techniques, however, may not be effective when the strength of the interference is comparable or greater than that of background noise.

SUMMARY OF THE DISCLOSURE

Accordingly, systems and methods are disclosed for computing soft information in the presence of interfering signals. These systems and methods enable wireless communication to occur without having to decompose the frequency spectrum into different frequency transmission channels.

The embodiments of the present invention can be employed in any suitable wireless communications system, such as a cellular system (e.g., a mobile network) or a wireless Internet system (e.g., a WiMAX network). Using a cellular system as an example, the cellular system may include a plurality of base stations that can each communicate with mobile stations (e.g., cellular telephones) that are within an area assigned to that base station. When a mobile station is connected to the cellular network, however, the mobile station may receive radio signals from not only an intended source (e.g., the base station assigned to cover the area that the mobile station is located in), but from one or more interfering sources (e.g., neighboring base stations transmitting data to other mobile stations). Thus, the mobile station may be configured to decode a received signal in a manner that takes into account not only characteristics of the intended source, but also any interfering sources.

Each mobile station can include a plurality of receive antennas from which the mobile station can receive a signal vector. From each antenna, the mobile station can obtain signals from one or more of the intended and interfering sources through the intended and interference channels. To accurately decode for the intended signal in the presence of interfering signals, the mobile station can estimate channel information for each interference channel and identify modulation information for each interfering source. To perform the former, the mobile station can analyze a pilot signal received from an interfering source, and can use this analysis to determine a channel gain associated with each interference channel. To perform the latter, the mobile station can decode control information, such as a DL-MAP message, that is received from each interfering source. This control information may be used to identify the modulation scheme, etc., implemented by the interfering base stations.

Using the channel information and modulation information, the mobile station can compute soft information for the information transmitted by the intended source. The soft information may be in the form of a log-likelihood ratio (LLR), for example. In one embodiment, to compute the soft information, the mobile station can calculate Euclidean distance-based metrics. Calculating a metric may involve computing the Euclidean distance between a receive signal vector and an expected receive signal vector for a particular set of intended and interference symbols. The expected receive signal vector may be obtained based on the channel information and the modulation information for not only the intended source/intended channel, but also each interfering source/interfering channel.

In some embodiments, the mobile station may adaptively determine which receive dimensions (e.g., antennas) to use when computing soft information for the intended information. For example, the mobile station may use only the signals from a subset of the receive antennas based on which antennas have the most information on the intended signal and/or least interference from the interfering sources. The mobile station may use a variant of a sorted QR operation on the channel matrix formed from the intended and interfering channels to identify the receive dimensions with the highest signal-to-interference plus noise ratio (SINR).

In some embodiments, the mobile station may also adaptively determine which transmit dimensions to use when computing soft information. That is, the mobile station can determine which of the interfering sources to consider when computing the soft information. For the interfering base stations that do not strongly affect the receive signal vector, the mobile station can ignore their affect. Alternately, the mobile station can model these weaker interfering signals as having a Gaussian distribution. By adaptively determining which receive and/or transmit dimensions to use in computing soft information, an appropriate subset of receive and/or transmit dimensions can be identified. The subset can be selected such that the decoding performance of the mobile station receiver is not significantly affected, yet allows the mobile station to decode a receive signal vector more efficiently (e.g., using fewer resources, such as speed-based, area-based, or power-based resources).

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
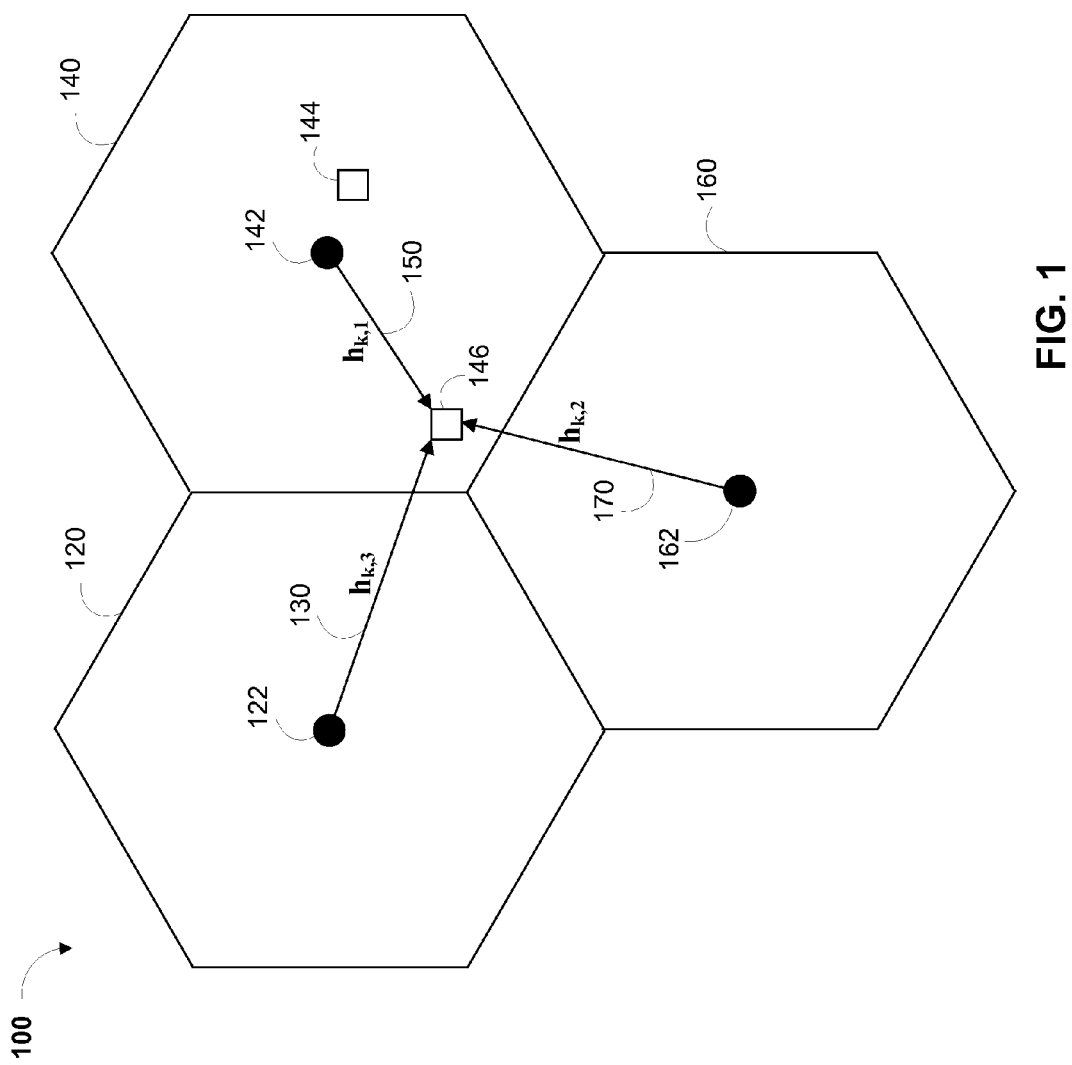
FIG. 1 is a schematic diagram of an illustrative cellular system.

FIG. 1 shows a simplified diagram of illustrative cellular system 100. Cellular system 100 can include a plurality of base stations that are interconnected to form a mobile or cellular network. These base stations can include base stations 122, 142, and 162. Each of these base stations can be configured to communicate with mobile stations located within a particular physical area within that base station's radio communications range. The physical area may be referred to as a radio cell. In particular, base station 122 may communicate with mobile stations within radio cell 120, base station 142 may communicate with mobile stations within radio cell 140 (e.g., mobile stations 144 and 146), and base station 162 may communicate with mobile stations within radio cell 160. In FIG. 1, radio cells 120, 140, and 160 are represented by hexagonal regions, although this shape is merely illustrative.

Mobile stations 144 and 146 may be any suitable type of cellular telephone. Mobile stations 144 and 146 may each have a plurality of receive antennas for receiving signals from the base stations of the mobile network. For simplicity, the number of receive antennas included in a mobile station (e.g., mobile station 144 or mobile station 146) may be referred to by the variable, $N_r$, where $N_r \geq 1$. Mobile stations 144 and 146 may operate using any suitable protocol that is compatible with base stations 122, 142, and 162, and with the mobile network in general. The base stations and mobile stations of cellular system 100 can operate using any suitable conventional cellular protocol, such as the Global Systems for Mobile communications ("GSM") standard or the code division multiple access ("CDMA") standard, or using a non-conventional protocol.

The base stations and mobile stations in cellular system 100 may use any of a variety of modulation and coding schemes to enable reliable communication. For example, base stations 122, 142, and 162 may operate with a modulation scheme based on orthogonal frequency division multiplexing ("OFDM"). Further examples of suitable modulation and coding schemes will be discussed in detail below in connection with FIGS. 2-5. To notify the mobile stations of the modulation and coding used by a base station, base stations 122, 142, and 162 may broadcast a control sequence to at least the mobile stations within their respective radio cells. In addition to coding and modulation information, the control sequence may also include any other suitable control information that the mobile stations may use to interpret the data sent by a base station. For example, the control sequence may include information on how the data frames are structured, how many symbols are included in each frame, and the intended recipient (e.g., mobile station) of the next data block.

Base stations 122, 142, and 162 may also transmit a pilot signal to each mobile station within its radio cell to provide each mobile station with, among other things, phase alignment information. The pilot signal may be modulated by a particular pseudo-noise ("PN") sequence, and each base station may utilize a different PN sequence. The different PN sequences may allow the mobile stations (e.g., mobile stations 144 and 146) to identify the base station associated with a received pilot signal. Therefore, mobile stations 144 and 146 may be able to identify and align their signal transmissions and receptions based on the pilot signal from base station 142.

Base stations 122, 142, and 162 may broadcast a pilot signal, control information, and network data to all mobile stations that are within radio communication range. This allows each base station to not only transmit information to any mobile station within that base station's radio cell, but also to mobile stations in neighboring radio cells that are sufficiently close to the base station. For example, due to the proximity of mobile station 144 to base station 142 in radio cell 140, mobile station 144 may predominantly receive information from base station 142. Mobile station 146, on the other hand, may be able to receive information not only from base station 142 in radio cell 140 (through channel 150), but may also receive interfering information from base station 162 in neighboring radio cell 160 (through channel 170) and from base station 122 in neighboring radio cell 120 (through channel 130). If base stations 122, 142, and 162 operate using the same frequency band or frequency channel such that signals received from these three sources are not easily distinguishable, mobile station 146 may suffer from an effect referred to sometimes as "inter-cell co-channel interference" (or simply "co-channel interference" or "interference"). The variable, J, may sometimes be used to define the number of base stations (including the intended base stations) that are considered to be affecting the signal vector received by mobile station 146. Thus, in the scenario illustrated in FIG. 1, J=3.

For simplicity, the radio signal expected by mobile station 146 (e.g., from base station 142, or the "intended source") may sometimes be referred to as the "intended signal," and channel 150 associated with the intended source may be referred to as the "intended channel." The radio signals received from neighboring base stations (e.g., from base stations 122 or 162, or an "interfering source") may sometimes be referred to as interference signals, and channels 130 and 170 associated with the interfering sources may be referred to as "interfering channels."

Intended channel 150 and interference channels 130 and 170 may each be associated with a particular channel vector that defines the amount that a signal traveling through the channel gets amplified/diminished and/or phase shifted before reaching the receive antennas of mobile station 146.

The channel vector for intended channel 150, interference channel 130, and interference channel 170 may sometimes be referred to by the variables, $h_{k,1}$, $h_{k,2}$, and $h_{k,2}$, respectively. Each $h_{k,j}$ may be an $N_r$-dimensional vector, where the first vector component defines the channel gain associated with the first receive antenna of mobile station 146 and the $N_r^{th}$ vector component defines the channel gain associated with the $N_r^{th}$ receive antenna. In these vectors, the k subscript may represent a particular time, frequency, or spatial sample of an intended or interference signal.

Thus, in the example of FIG. 1, mobile station 146 may receive a signal vector, $y_k$, that is given mathematically by $$y_k = h_{k,1}x_{k,1} + h_{k,2}x_{k,2} + h_{k,3}x_{k,3} + z_k. \quad \text{(EQ. 1)}$$

Here, $x_{k,j}$ may be the signal transmitted from the jth base station for $1 \leq j \leq J$. $x_{k,1}$ may be a signal intended for mobile station 146, while $x_{k,2}$ and $x_{k,3}$ may be interfering signals that are intended for mobile stations in radio cells 120 and 160, respectively. $z_k$ may be a vector of the $N_r$ additive noise components that affect the $N_r$ receive antennas of mobile station 146. In some embodiments, $z_k$ may be background noise that can be modeled as additive white Gaussian noise (AWGN) with a probability distribution function given by $$AWGN_{PDF|y_k} = \frac{1}{\sigma\sqrt{2\pi}} \exp\left(-\frac{\|y_k - E[y_k]\|^2}{2\sigma^2}\right). \quad \text{(EQ. 2)}$$

In general, for J base stations, where the first base station is the intended source, a receive signal vector may be given by $$y_k = h_{k,1}x_{k,1} + \sum_{j=2}^{J} h_{k,j}x_{k,j} + z_k. \quad \text{(EQ. 3)}$$

For simplicity, the second term of EQ. 3 may be referred to as the interference term, and EQ. 3 may be rewritten as $$y_k = h_{k,1}x_{k,1} + w_k + z_k, \quad \text{(EQ. 4)}$$

where $w_k$ is a signal component representing the interference term. EQ. 4 may again be written as EQ. 5 below, where EQ. 5 is expressed in terms of the intended signal and an interference plus noise component:

$$y_k = h_{k,1}x_{k,1} + v_k \quad \text{(EQ. 5)}$$

Thus, $v_k$ may hereinafter represent the interference plus noise component of a receive signal vector.

The receive signal vector may be more succinctly represented by a channel matrix, a transmit signal vector, and a noise vector. In particular, the receive signal vector may be given by $$y_k = H_k x_k + z_k, \quad \text{(EQ. 6)}$$

where the channel matrix, $H_k$, is a vector concatenation of the individual channel vectors for each intended and interference channels, e.g., $$H_k = [h_{k,1} h_{k,2} \ldots h_{k,J}]. \quad \text{(EQ. 7)}$$

Similarly, the transmit signal vector is a vector composed of each transmit signal, e.g., $$x_k = [x_{k,1} x_{k,2} \ldots x_{k,J}]^T. \quad \text{(EQ. 8)}$$

As shown in EQ. 7 and EQ. 8, the intended channel may be the first column of the channel matrix and the intended signal may be the first vector component of the transmit signal vector.

Returning to FIG. 1, in many scenarios, the co-channel interference (e.g., the effect of base stations 122 and 162 on mobile station 146) may be stronger than any noise that occurs during data transmission from base station to mobile station. This may be especially true when a mobile station is near the boundary of two or more radio cells. In current communications protocols, such as GSM, co-channel interference is circumvented by having neighboring base stations broadcast network data using different frequency channels. For example, if cellular system 100 were to operate using one of these current protocols, the mobile network can assign a first frequency channel to base station 122 and radio cell 120, a second frequency channel to base station 142 and radio cell 140, and a third frequency channel to base station 162 and radio cell 160. By having neighboring base stations use different frequency channels, a mobile station in a particular radio cell can suffer from little to no interference from a base station in a neighboring radio cell. For example, in this scenario, even though mobile station 146 can receive an interference signal from neighboring base station 162, mobile station 146 can tune into only the frequency channel of base station 142 to ensure that radio signals from base station 162 are substantially excluded.

The communications technique of assigning neighboring base stations or sectors different frequency bands may be referred to as frequency reuse. Cellular system 100 may, as described above, use three different frequency channels to implement frequency reuse. Such a communications system may be referred to as having a frequency reuse of 3 or ⅓. GSM illustrates one protocol that can, in some embodiments, be implemented by the mobile network of cellular system 100. GSM uses seven different frequency channels and therefore has a frequency reuse of 7 or ⅐.

While frequency reuse ensures that mobile stations will not suffer from much interference, frequency reuse does not efficiently utilize the bandwidth made available to cellular systems. That is, cellular systems are assigned a limited amount of bandwidth. With each base station using only a fraction of the available bandwidth, each base station has a spectral efficiency (and therefore a maximum data rate) that is well below the spectral efficiency and data rate that can be achieved. Accordingly, embodiments of the present invention include techniques that enable a frequency reuse of one. In particular, embodiments of the present invention advantageously provide techniques that can counter the effects of inter-cell co-channel interference such that using different frequency channels in neighboring radio cells or cell sectors is unnecessary.

Thus, in some embodiments, base stations 122, 142, and 162 may transmit data to mobile stations using up to the full frequency band available to the mobile network. To ensure reliability in communicating the control message, which in turn allows a mobile station to accurately interpret data, the control message may be transmitted with strong encoding and with frequency reuse. For the example of FIG. 1, base stations 122, 142, and 162 may operate using a frequency reuse of 3 or ⅓ when transmitting control information and may operate using a frequency reuse of one when transmitting data. This example applies to WiMax systems, which, if implemented here, may transmit control information referred to as a DL-MAP message with a frequency reuse of 3 or ⅓. A transmission scheme that uses frequency reuse only when transmitting control information may be advantageous, as reliability in communicating the control message is maintained without concern for inter-cell co-channel interference, while data (which can constitute the majority of the information transmitted from a base station) is transmitted with high spectral efficiency and data rate.

While some embodiments of the present invention are described in terms of a mobile station that receives intended and interfering information from various base stations, this is merely to simplify the description of the present invention. These embodiments may also be used to allow a base station to handle intended and interfering information received from various mobile stations. That is, some or all of the embodiments described herein for the downlink scenario may also be applied to the uplink scenario. Also, the present invention may be implemented not only in cellular systems, but in any application that may suffer from inter-cell co-channel interference.

Figure 2:
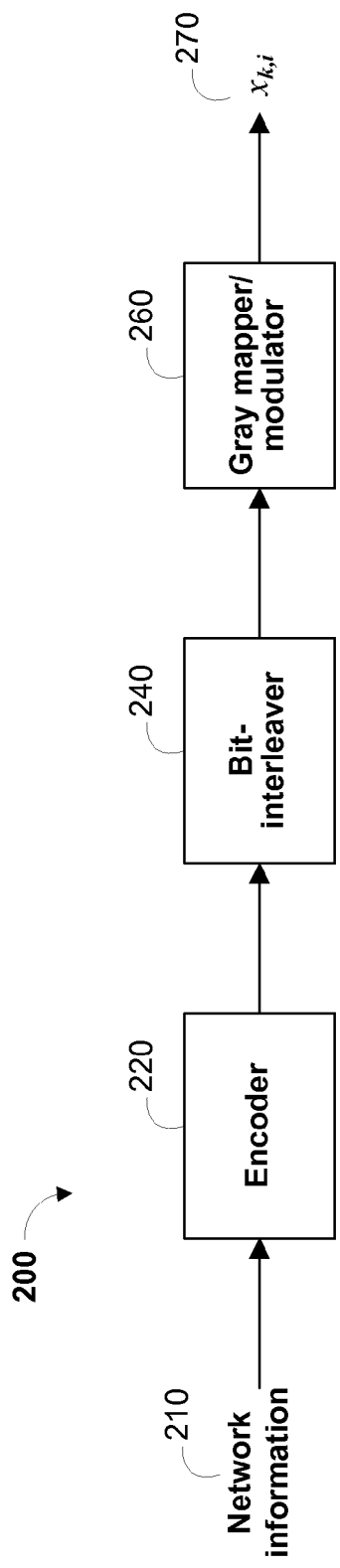
FIG. 2 is a simplified block diagram of an illustrative base station transmitter.

FIG. 2 shows a simplified block diagram of base station transmitter 200 that can prepare network information 210 for transmission as radio signal 270. In some embodiments, base station transmitter 200 may be implemented as the transmitter for one or more of base stations 122, 142, and 162 of FIG. 1. Base station transmitter 200 can include encoder 220, bit-interleaver 240, and Gray mapper/modulator 260.

Encoder 220 may encode network information 210 based on a suitable error correcting code ("ECC"). For example, encoder 220 may operate using a convolutional code (e.g., a rate-1/2, rate-2/3 convolutional code, convolutional Turbo code) of memory m. Encoder 220 may therefore convert network information 210, which may be some form of digital information (e.g., a stream of binary data), into an encoded stream of binary data. Since encoder 220 may have a memory of m, each m consecutive bits in the encoded stream created by encoder 220 depends on the value of the same one bit of network information 210. In order to remove any adverse effects that may result from this dependency (e.g., the inability to reliably decode when burst errors are present), the encoded stream may be interleaved by bit-interleaver 240. In particular, bit-interleaver 240 may change the order of the bits in the encoded stream to ensure that neighboring bits in the interleaved sequence are effectively independent of each other.

Gray mapper/modulator 260 of base station transmitter 200 may be configured to convert the interleaved digital sequence produced by bit-interleaver 240 into a signal for transmission. Gray mapper/modulator 260 may first group bits of the interleaved sequence into symbols based on the size of a modulation scheme, and may then modulate the symbols into a signal having a particular magnitude and phase specified by the modulation scheme. Gray mapper/modulator 260 may use any suitable modulation scheme of any of a variety of sizes. For example, Gray mapper/modulator 260 may utilize a quadrature amplitude modulation ("QAM") scheme (e.g., 4QAM, 16QAM, 32QAM) or a phase shift keying ("PSK") modulation scheme (e.g., QPSK, 16PSK, 32PSK).

The particular modulation scheme employed by Gray mapper/modulator 260 may be designed to operate effectively with the particular error correcting code (ECC) employed by encoder 220. This type of communications technique is commonly referred to as coded modulation. Therefore, as base station transmitter 200 of FIG. 2 also includes bit-interleaver 240, the overall communications technique employed by base station transmitter 200 can be referred to as bit-interleaved coded modulation ("BICM").

Figure 4:
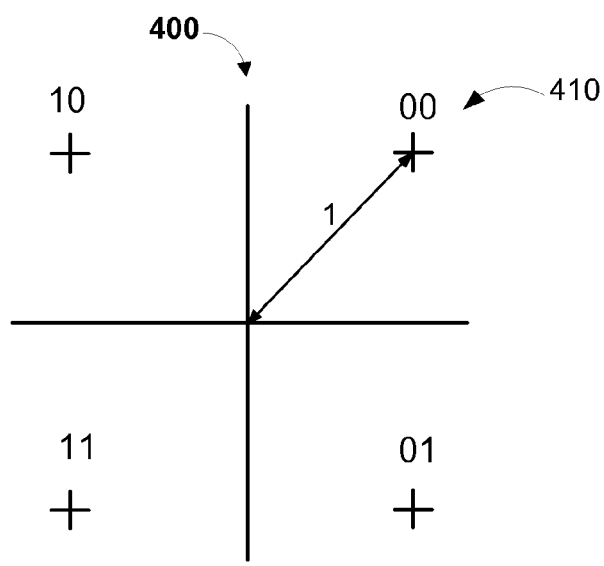
FIG. 4 is a 4QAM/QPSK signal constellation set that may be used by the base station transmitter of FIG. 2 and/or the mobile station receiver of FIG. 3.
Figure 5:
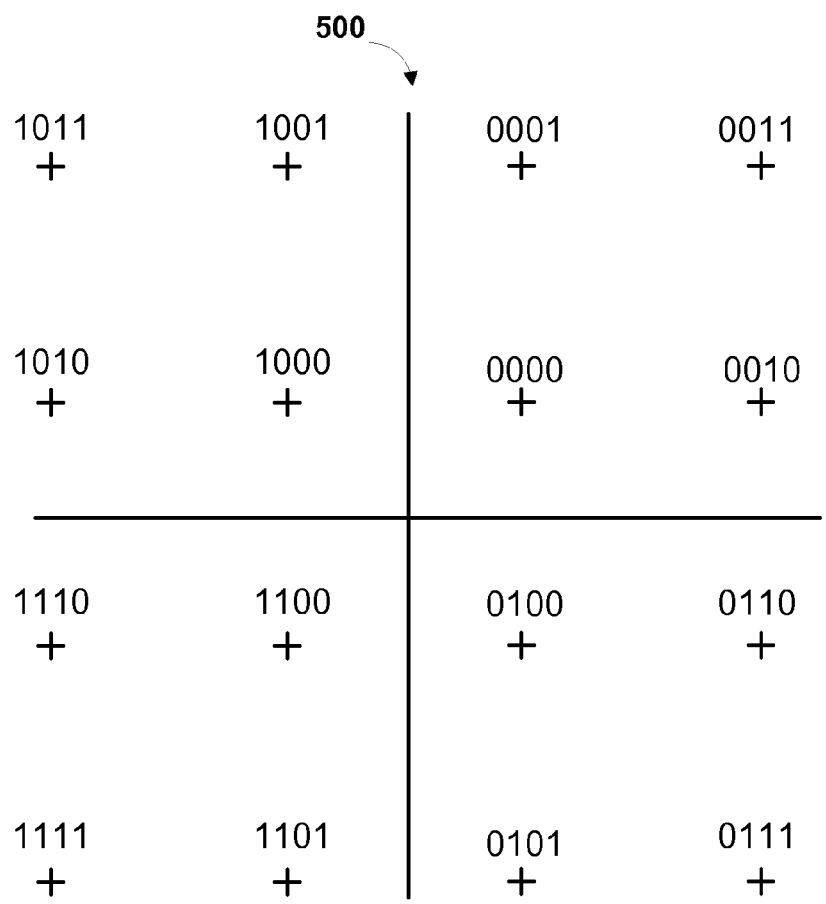
FIG. 5 is a 16QAM signal constellation set that may be used by the base station transmitter of FIG. 2 and/or the mobile station receiver of FIG. 3.

The modulation scheme used by Gray mapper/modulator 260 may be associated with a signal constellation set that defines the magnitude and phase of a carrier signal that is transmitted for each possible symbol value. For example, FIG. 4 shows an illustrative signal constellation set 400 for a 4QAM/QPSK modulation system, and FIG. 5 shows an illustrative signal constellation set 500 for a 16QAM modulation scheme. In these figures, the respective constellation sets are shown on a complex number plane, where each "+" represents a signal constellation point having a particular phase and magnitude. For example, referring to FIG. 4, signal constellation point 410 has a magnitude of one and a phase of +45 degrees. Thus, when that signal constellation point is selected for transmission, Gray mapper/modulator 260 may produce a radio signal that has a magnitude of one and a phase of +45 degrees.

Each signal constellation point in signal constellation sets 400 is associated with a particular two-bit symbol, and each signal constellation point in set 500 is associated with a particular 4-bit symbol. The symbols in these respective constellation sets may be assigned to particular signal constellation points based on a Gray code mapping. A Gray code mapping maps neighboring signal points in the modulation scheme to symbols that differ in only one bit. For example, in FIG. 4, the two signal points that correspond to symbols differing by two bits ("00" and "11") are not neighboring signal points. Gray code mapping therefore ensures that, even if a signal were mistaken for a neighboring signal point when decoded, the incorrectly decoded signal can be incorrect in only one bit.

Returning to FIG. 2, Gray code mapper/modulator 260 may produce radio signal 270, or $x_k$, for transmission to one or more mobile stations (e.g., mobile stations 144 or 146). If different symbols are transmitted in different time periods (e.g., symbol periods), $x_k$ may represent the value of radio signal 270 sampled at time k. In some embodiments, k represents another type of dimension of radio signal 270 other than time, such as a spatial dimension or frequency dimension. Radio signal 270 may be transmitted through a frequency channel (e.g., channel 170 of FIG. 1) and received by the receive antennas of a mobile station receiver, such as the mobile station receiver shown in FIG. 3.

Figure 3:
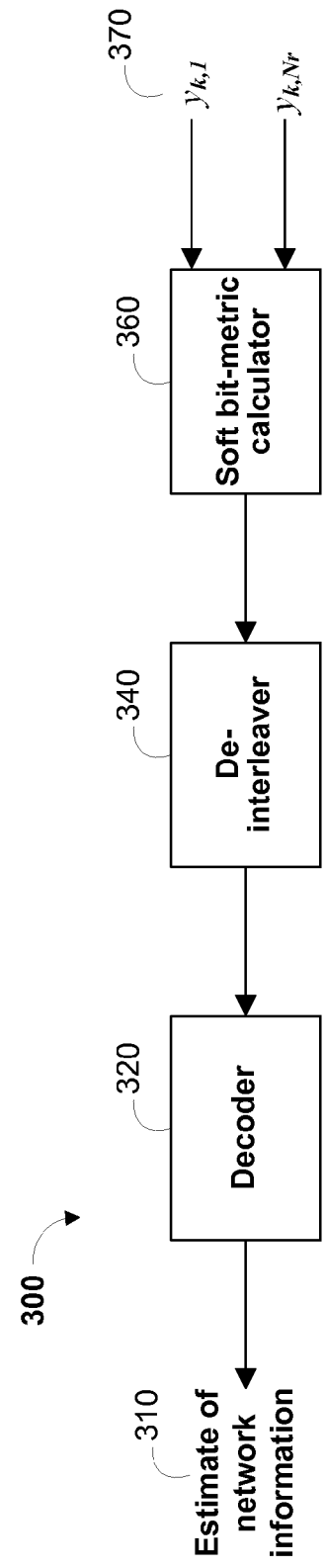
FIG. 3 is a simplified block diagram of an illustrative mobile station receiver with a plurality of receive antennas.

FIG. 3 shows a simplified block diagram of mobile station receiver 300. In some embodiments, mobile station receiver 300 may be implemented as part of one or both of mobile stations 144 and 146. Mobile station receiver 300 can include $N_r$ receive antennas that are each operable to receive a signal that is a superposition of the intended signal (e.g., radio signal 270) and one or more interference signals. That is, mobile station receiver 300 may receive signal vector 370 from these receive antennas that can be mathematically represented by EQ. 3 through EQ. 6 above. Thus, each vector component of receive signal vector 370 may be a linear combination of the signals transmitted from the J (e.g., three) base stations.

Mobile station receiver 300 can be configured to decode receive signal vector 370 and obtain an estimate of the originally transmitted information (e.g., network information 210 of FIG. 2). To decode receive signal vector 370, mobile station receiver 300 can include soft bit-metric calculator 360, de-interleaver 340, and decoder 320. Each of these receiver components may correspond to a transmitter component in base station transmitter 200 and may effectively undo the operation performed by the corresponding transmitter component. For example, soft bit-metric calculator 360 may correspond to Gray mapper/modulator 260 that can demodulate/de-map receive signal vector 370 using at least the same modulation scheme and signal constellation set as that used by Gray mapper/modulator 260. De-interleaver 340 may correspond to bit-interleaver 240 and may return the symbol order of the received data into its original order, e.g., the order expected by decoder 320. Decoder 320 may be a soft-decoder that corresponds to encoder 220, and may perform decoding based on the same error correcting code (e.g., convolutional code) as encoder 220. Thus, decoder 320 may produce estimate 310 of network information (e.g., network information 210). In some embodiments, decoder 320 may be a Viterbi decoder or a Turbo decoder. If mobile station receiver 300 successfully interprets receive signal vector 360, estimate 310 may be the same digital sequence as network information 210.

Referring to soft bit-metric calculator 360 of FIG. 3 in more detail, soft bit-metric calculator 360 may calculate soft information for each bit of information contained within the intended signal. The soft information may be in the form of a log-likelihood ratio ("LLR") for each received bit of intended information. Alternatively, the soft information can be proportional to an LLR. Soft bit-metric calculator 360 may calculate an LLR according to EQ. 8:

$$LLR(b_i \mid y_k) = \log \frac{Pr(b_i = 0 \mid y_k)}{Pr(b_i = 1 \mid y_k)} \quad \text{(EQ. 8)}$$

where $b_i$ is the transmitted bit of the intended information contained within $y_k$ for which the LLR is being calculated. Soft bit-metric calculator 360 can obtain a reliable log-likelihood ratio based on EQ. 8 by using accurate estimates of the channel information for the intended channel and any interference channels, as well as modulation information for these channels.

To compute the channel information estimate, mobile station receiver 300 may, for example, include computational logic (not shown) that is configured to estimate the interference channel gain for each receive antenna and each interfering source. The computational logic may also be configured to compute the intended channel gain for each receive antenna. The computational logic can compute these channel information estimates by analyzing the characteristics of pilot signals received from each base station. Because each signal source modulates the pilot signal based on a unique PN sequence, the computational logic can distinguish between the different pilot signals. From the analysis of various pilot signals, the computational logic produces an estimate of the interference and/or intended channel gain, for example. Mobile station receiver 300 may compute the channel information estimates at any suitable time during operation, such as at power-up, when initially connected to a base station, periodically, or whenever the pilot signal is transmitted, etc. Channel information estimates can be computed in this manner for embodiments where receiver 300 is implemented on a mobile station and for embodiments where receiver 300 is implemented on a base station.

Mobile station receiver 300 may also include a control information decoder (not shown) to compute the modulation information for an intended source and any interference sources. For example, in a WiMAX system, receiver 300 may include a DL-MAP decoder that decodes a DL-MAP message received from each base station. From the DL-MAP message, mobile station receiver 300 can retrieve the modulation information. As described above, the modulation information may include the modulation scheme (e.g., QAM, PSK, PAM), the size of the modulation scheme, and the magnitude/phase associated with the modulation scheme. Since a DL-MAP message or other control message may be heavily encoded and may be transmitted using frequency reuse, the receiver may be able to accurately decode the control information from the interfering source even if noise and/or interference prevents receiver 300 from accurately decoding regular data from the interfering source.

Using the estimated channel information and the modulation information for the intended and interference sources, soft bit-metric calculator 360 of mobile station receiver 300 (FIG. 3) can accurately determine the expected receive signal vector for a given transmit signal vector in the presence of AWGN, which can be useful as a comparison to the actual receive signal vector. In particular, rather than computing the expected receive signal vector based on only the intended signal, soft bit-metric calculator 360 may compute the expected receive signal vector based on substantially all of the signals that can affect the receive signal vector. For example, referring briefly again to FIG. 4, if an interfering source operates with a 4QAM scheme and signal constellation set 400, soft bit-metric calculator 360 can compute the expected receive signal vector with the knowledge that the interference from this interfering source takes on only four possible values (e.g., magnitude of one with four different phases). Thus, this technique improves upon conventional systems, such as matched filter-based or equalization-based (e.g., ZF or MMSE-based) systems, which operate under the assumption that all interfering signals may be modeled as AWGN with zero mean.

With continued reference to FIG. 3, soft bit-metric calculator 360 may operate under the assumption that only the background noise, $z_k$, can be modeled as AWGN, and can be configured to compute the log-likelihood ratio for bit $b_i$ of the intended information according to $$LLR_i = \log\left(\sum_{x_1 \in X_{1,l_i}^{(1)}, \ldots, x_j \in X_J} \exp\left(-\frac{\left\|y_{k_i} - \sum_{j=1}^{J} h_{k_i,j} x_j\right\|^2}{\sigma_z^2}\right)\right) - \quad \text{(EQ. 9)}$$

$$\log\left(\sum_{x_1 \in X_{1,l_i}^{(0)}, \ldots, x_j \in X_J} \exp\left(-\frac{\left\|y_{k_i} - \sum_{j=1}^{J} h_{k_i,j} x_j\right\|^2}{\sigma_z^2}\right)\right)$$

In EQ. 9, $X_i^{(j)}$ is the set of symbols that have a bit value of j at bit position $b_i$ and $\sigma_z^2$ is the power of the noise, $z_k$. Here, the expression $$\sum_{j=1}^{J} h_{k_i,j} x_j = H_k x_k$$

in both logarithm computations produces an accurate estimate of the expected receive signal vector for each possible transmit vector (e.g., in FIG. 4, the four different possible values for each signal component, and in FIG. 5, the 16 different possible values for each signal component). This expression is a function of the channel vector for each base station and a transmit signal from each base station. Therefore, the expression uses both the channel information estimate (to obtain each $h_{k_i,j}$) and the modulation information (e.g., information on a signal constellation set, such as those in FIGS. 4 and 5, to obtain each $x_j$).

It should be understood that EQ. 9, and any of the other LLR equations provided below are merely illustrative, and that other LLR equations may be computed by soft bit-metric calculator 360 without departing from the scope of the present invention. For example, soft bit-metric calculator 360 can operate using a different equation that is based on a distance between a receive signal vector and one or more expected receive signal vectors. This distance calculation may sometimes be referred to as a "distance metric." Soft bit-metric calculator 360 can operate using any suitable distance metric, including but not limited to the distance metric of EQ. 9.

Instead of computing EQ. 9, in some embodiments, an approximation can be implemented to simplify the complexity of the hardware (e.g., logic) or software. For example, of soft bit-metric calculator 360 may employ an approximation for computing logarithms (referred to sometimes as the max-log-map approximation), and can instead calculate, $$LLR_{i,approx} = \frac{1}{\sigma_z^2}\left[\min_{x_1 \in X_{1,l_i}^{(1)}, \ldots, x_J \in X_J}\left\{\left\|y_{k_i} - \sum_{j=1}^{J} h_{k_i,j} x_j\right\|^2\right\} - \min_{x_1 \in X_{1,l_i}^{(0)}, \ldots, x_J \in X_J}\left\{\left\|y_{k_i} - \sum_{j=1}^{J} h_{k_i,j} x_j\right\|^2\right\}\right].$$ (EQ. 10)

Note that EQ. 10, unlike EQ. 9, advantageously does not include potentially resource-intensive exponential or logarithm computations. Moreover, EQ. 10 ultimately uses only two possible values of the transmit signal vector (a first value with $b_i=0$ and a second value with $b_i=1$) to compute the approximate LLR, and not all of the possible values of the transmit signal vector.

The computations of EQ. 9 and EQ. 10 can be further simplified by altering the squared Euclidean distance calculation. That is, rather than computing the distance metric ("DM"), $$DM = \|y_k - H_k x_k\|^2$$ (EQ. 11)

in EQ. 9 and/or EQ. 10, the squared distance computation may be altered in a way that does not change the result of the computation. For example, soft bit-metric calculator 360 may compute the distance metric, $$DM = \|U_k^* y_k - U_k^* H_k x_k\|^2$$ (EQ. 12)

in place of the squared Euclidean distances shown in EQ. 9 and/or EQ. 10. Here, $U_k^*$ is the inverse of a unitary matrix, $U_k$. Because the multiplication is performed using a unitary matrix, this multiplication does not affect the magnitude of each component, and therefore also does not affect the squared Euclidean distance.

In some embodiments, the unitary matrix may be $Q_k$, which is the unitary matrix that results from the QR decomposition of the channel matrix. In particular, the channel matrix may be decomposed as follows:

$$H_k = Q_k R_k,$$ (EQ. 13)

where $Q_k$ is an $N_r \times N_r$ unitary matrix and $R_k$ is an $N_r \times J$ upper triangular matrix. By preprocessing the channel matrix using $Q_k^*$ (e.g., using a preprocessor implemented on mobile station receiver 300 that is not shown), the Euclidean distance metric may be reduced to $$DM = \|Q_k^* y_k - R_k x_k\|^2$$ (EQ. 14)

for the different possible transmit signal vectors. The critical path in the computation of the Euclidean distance metric is the multiplication of a matrix by the transmit signal vector, since this multiplication can occur for up to every possible value of the transmit signal vector. Therefore, by altering the Euclidean distance metric such that the transmit signal vector is multiplied by an upper triangular matrix instead of a full matrix, the computational complexity of the Euclidean distance metric may be decreased substantially. It should be understood that the use of $Q_k$ as the unitary matrix is merely illustrative, and other suitable unitary matrices may be selected instead.

In some operating scenarios, the strength of interfering signals may be strong compared to that of the intended signal on only a subset of the receive antennas. That is, the signal-to-interference plus noise ratio (SINR) may be different for different receive antennas such that some of the antennas are strongly affected by interfering signals while others are not. A mobile station can be configured to compute soft information using only those receive antennas having a SINR with at least a predetermined value (e.g., 2 dB, 5 dB, etc.). For example, referring back to FIG. 1, mobile station 146 may have three receive antennas, where the first receive antenna receives primarily the signal from intended base station 142 (high SINR), the second receive antenna receives primary the signal from interference base station 122 (low SINR), and the third receive antenna receives primary the signal from interference base station 162 (low SINR). In this example, mobile station 146 may be able to accurately estimate the intended information using only the signal received on the first antenna. The signals receives on ⅔ of the receive antennas may be ignored, thereby decreasing the amount and/or complexity of the computations necessary to obtain soft information for the intended information. More particularly, mobile station 146 may compute EQ. 9 or EQ. 10 to obtain soft information, but can compute these equations using fewer than the $N_r$ components of the receive and channel vectors. As described in greater detail below, the mobile stations configured in accordance with the principles of the present invention, such as mobile station 146, may adaptively determine a subset of the receive dimensions (e.g., receive antennas) to use when decoding a receive signal vector.

In some operating scenarios, an interfering source may not have a strong effect on a mobile station compared to the intended source and/or other interfering sources. For example, referring again to FIG. 1, as mobile station 146 travels towards the right of the figure and away from radio cell 120, the interference that mobile station 146 experiences may no longer be strongly affected by the signals transmitted by base station 122. Therefore, mobile station 146 may completely stop including the interfering signal from base station 122 in the log-likelihood equation of EQ. 9 and/or EQ. 10. In particular, when computing EQ. 9 and/or EQ. 10, mobile station 146 may compute fewer total Euclidean distance metrics, because of the decrease in number of total possible transmit signal vectors. Also, the number of computations in each Euclidean distance metric may be decreased, since J is decreased. Therefore, by adaptively decreasing the number of base stations considered to be a specific subset of base stations, the complexity of computing soft information can be minimized.

In some embodiments, rather than completely ignoring base stations when they are adaptively determined to not have a strong effect, the interference signals from these base stations may instead be modeled as background noise. For example, mobile station 146 of FIG. 1 can model the interference signal as AWGN, and can compute EQ. 9 and/or EQ.

10 by including the power of the interfering signal with $\sigma_z^2$, the power of the background noise. This way, the complexity of computing soft information can be decreased without completely ignoring the presence of an interfering source.

Referring again to FIG. 3, mobile station receiver 300 may use a subset of the receive dimensions (e.g., receive antennas) when computing a log-likelihood ratio by applying a matrix having orthogonal columns to EQ. 9 and/or EQ. 10 above. This matrix may sometimes be referred to as a modifying matrix and may be denoted by $\tilde{U}_k$. The modifying matrix may be an $N_r \times M$ matrix, where M is the number of receive dimensions selected for inclusion in the subset, and therefore $M \leq N_r$.

Soft bit-metric calculator 360 can compute an exact value of a log-likelihood ratio using distance metrics based on the original channel matrix (EQ. 11) or the channel matrix modified by a unitary matrix (FIG. 12). Using the modifying matrix, soft bit-metric calculator 360 can instead compute an approximate value of the LLR. Soft bit-metric calculator 360 may modify both the received signal vector and the original channel matrix by multiplying each by the inverse of the modifying matrix, e.g., $$\tilde{y}_k = \tilde{U}_k^* y_k, \text{ and} \tag{EQ. 15}$$

$$\tilde{H}_k = \tilde{U}_k^* H_k. \tag{EQ. 16}$$

The product of EQ. 15 may sometimes be referred to as a modified receive signal vector, and the product of EQ. 16 may sometimes be referred to as a modified channel matrix. Soft bit-metric calculator 360 may then use an approximate distance metric given by $$DM \approx DM_{approx,RX} = \|\tilde{y}_k - \tilde{H}_k x_k\|^2 \tag{EQ. 17}$$

to calculate the log-likelihood ratio or another suitable soft bit metric. For example, in some embodiments, soft bit-metric calculator 360 can compute $$LLR_i = \log\left(\sum_{x_1 \in X_{1,l_i}^{(1)}, \ldots, x_J \in X_J} \exp\left(-\frac{\left\|\tilde{y}_{k_i} - \sum_{j=1}^J \tilde{h}_{k_i,j} x_j\right\|^2}{\sigma_z^2}\right)\right) - \log\left(\sum_{x_1 \in X_{1,l_i}^{(0)}, \ldots, x_J \in X_J} \exp\left(-\frac{\left\|\tilde{y}_{k_i} - \sum_{j=1}^J \tilde{h}_{k_i,j} x_j\right\|^2}{\sigma_z^2}\right)\right), \tag{EQ. 18}$$

which has the same form as EQ. 9 except that EQ. 18 includes the modified receive signal vector and the modified channel matrix instead of the original receive signal vector and original channel matrix. In some embodiments, soft bit-metric calculator 360 may use the max-log-map approximation, and can compute the log-likelihood ratio for each transmitted bit according to, $$LLR_{i,approx} = \frac{1}{\sigma_z^2}\left[\min_{x_1 \in X_{1,l_i}^{(1)}, \ldots, x_J \in X_J}\left\{\left\|\tilde{y}_{k_i} - \sum_{j=1}^J \tilde{h}_{k_i,j} x_j\right\|^2\right\} - \min_{x_1 \in X_{1,l_i}^{(0)}, \ldots, x_J \in X_J}\left\{\left\|\tilde{y}_{k_i} - \sum_{j=1}^J \tilde{h}_{k_i,j} x_j\right\|^2\right\}\right]. \tag{EQ. 19}$$

For example, with three receive antennas and two interfering sources, soft bit-metric calculator 360 may use a matrix with two columns, such as $$\tilde{U}_k = \begin{bmatrix} 1 & 0 \\ 0 & 1 \\ 0 & 0 \end{bmatrix}, \tag{EQ. 20}$$

so that only two receive dimensions are considered when $\tilde{U}_k^*$ is multiplied by the receive signal vector in the Euclidean distance-based metrics of EQ. 17.

When only one receive antenna is used to compute soft information according, the Euclidean distance-based metric of EQ. 17 reduces to $$DM = \left\|r_k - \sum_{j=1}^J u_k^* h_{k,j} x_{k,j}\right\|^2 \tag{EQ. 21}$$

for a filtered receive signal given by $$r_k = u_k^* y_{k,1} = \sum_{j=1}^J u_k^* h_{k,j} x_{k,j} + u_k^* z_k. \tag{EQ. 22}$$

In this case, the modifying matrix $\tilde{U}_k$ may be any column vector, $u_k$ with a norm of one. In some embodiments, a normalized matched filter approach may be used, where the column vector can be $$u_k = \frac{h_{k,1}}{\|h_{k,1}\|}. \tag{EQ. 23}$$

Any other suitable column vector may be used instead of the vector given by EQ. 23, such as a minimum-mean squared error (MMSE) filter.

In some embodiments, soft bit-metric calculator 360 may reduce not only the number of receive dimensions when computing soft information, but may also reduce the number of transmit dimensions. To compute an LLR using all J transmit dimensions that are initially considered, soft bit-metric calculator 360 uses the approximate distance metric of EQ. 17, reproduced as EQ. 24:

$$DM_{approx,Rx} = \|\tilde{y}_k - \tilde{H}_k x_k\|^2 = \left\|\tilde{y}_k - \sum_{j=1}^J \tilde{h}_{k,j} x_j\right\|^2. \tag{EQ. 24}$$

In some embodiments, soft bit-metric calculator 360 may need to evaluate EQ. 24 for every possible value of the transmit signal vector, $x_k$. This computation may be resource-intensive, especially for larger values of J. Therefore, in some embodiments, soft-bit metric calculator 360 may ignore one or more interfering sources, j, when the corresponding modified channel vector $\tilde{h}_{k,j}$ has a low channel gain (e.g., a low norm), or soft-bit metric calculator 360 may treat the one or more interfering sources as background noise sources (e.g., AWGN sources). Soft bit-metric calculator 360 may then compute soft information with a distance metric given by, $$DM_{approx,Rx,Tx} = \left\| \tilde{y}_k - \sum_{j \in S_J} \tilde{h}_{k,j} x_j \right\|^2. \quad \text{(EQ. 25)}$$

In EQ. 25, $S_J$ is the set of indices corresponding to the intended source and any significant interfering sources. The selection of the set $S_J$ can determine the decoding performance of the receiver. Depending on the number of interfering sources and which of the interfering sources are included, the approximation may cause the decoding performance of the receiver to be relatively accurate or relatively rough.

In some embodiments, soft bit-metric calculator 360 can reduce the number of transmit dimensions used in LLR computation without reducing the number of receive dimensions used. In these embodiments, the modifying matrix may be a unitary matrix of full dimension.

Figure 6:
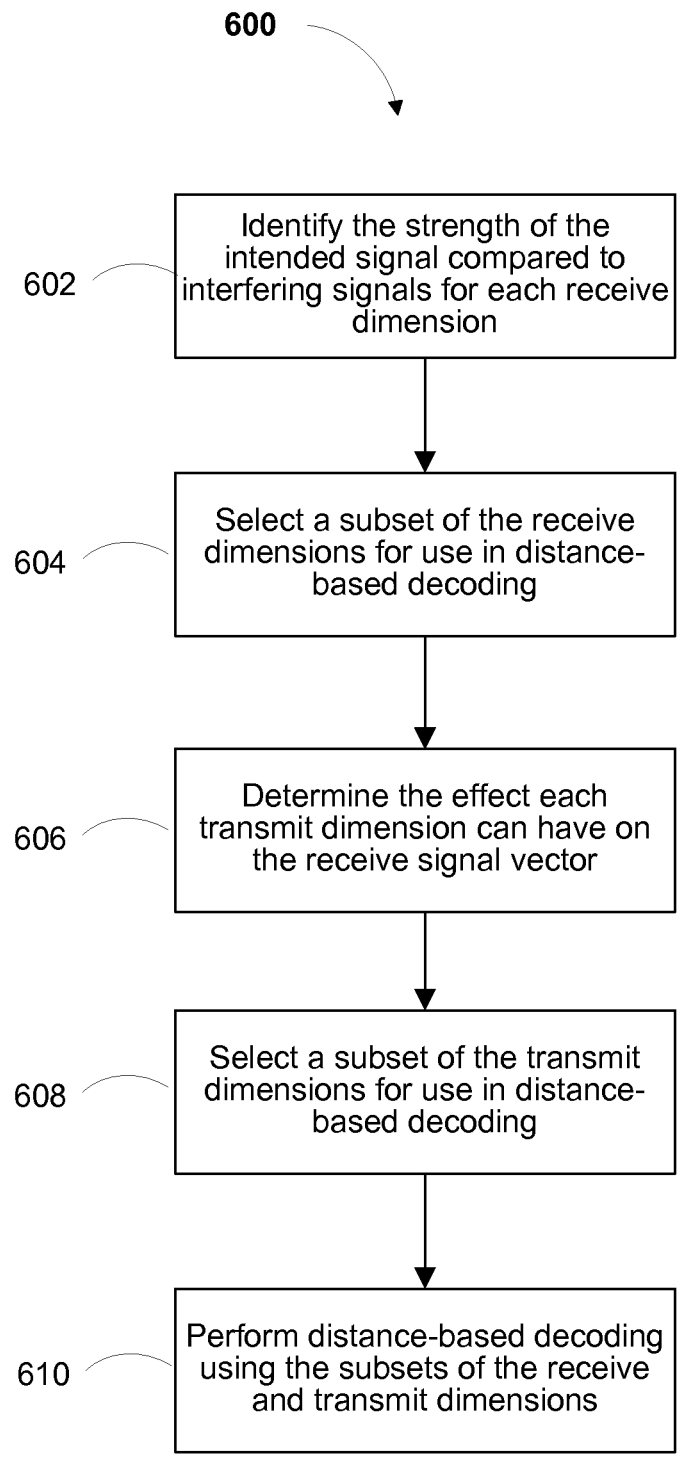
FIG. 6 is a simplified flow diagram of an illustrative process for reducing the number of transmit and/or receive dimensions used for computing soft bit metrics.
Figure 7:
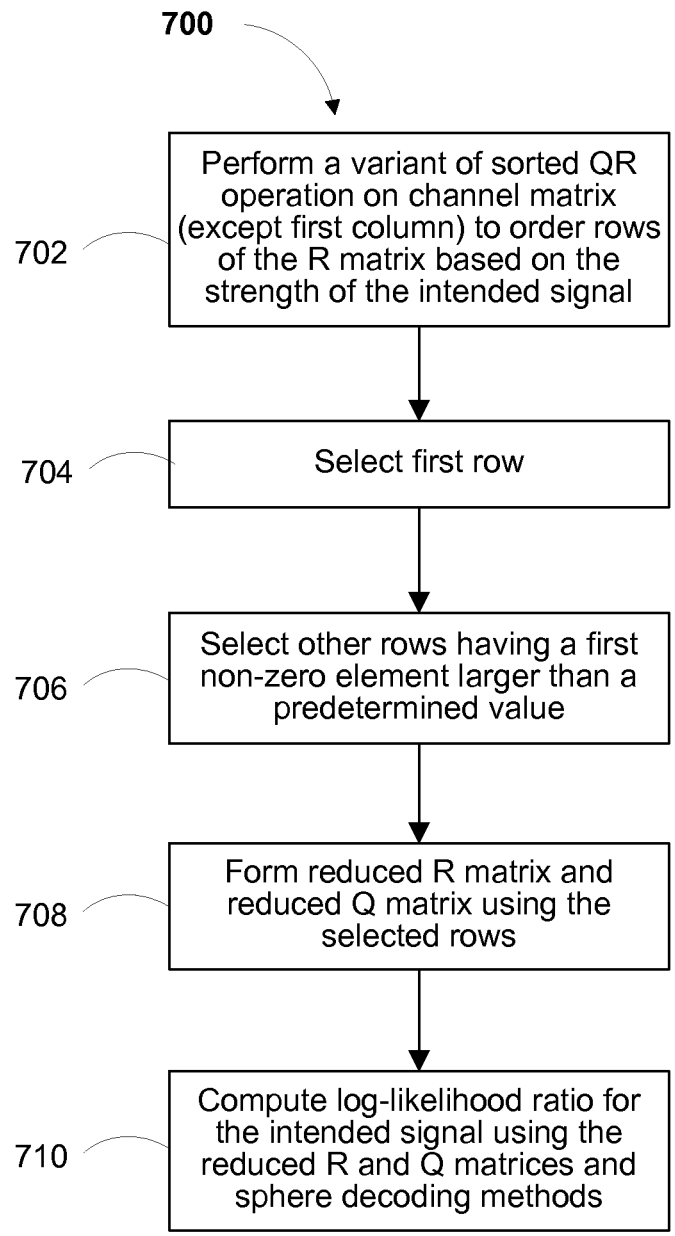
FIG. 7 is a more detailed, yet still simplified, flow diagram of an illustrative process for reducing the number of receive dimensions used for computing soft bit metrics.
Figure 8:
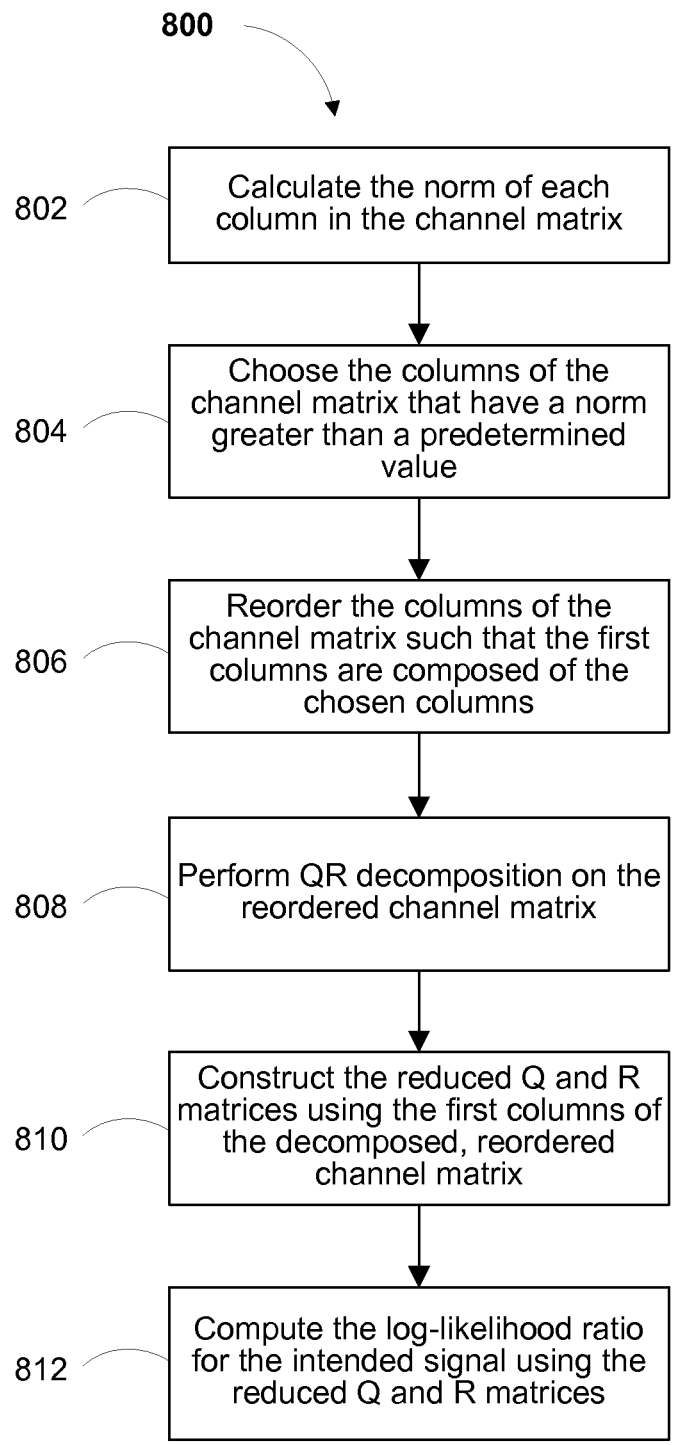
FIG. 8 is a more detailed, yet still simplified, flow diagram of an illustrative process for reducing the number of transmit and receive dimensions used for computing soft bit metrics.

Referring now to FIGS. 6-8, simplified flow diagrams of illustrative processes are shown for adaptively selecting the receive and/or transmit dimensions to use for computing soft information. These processes may be performed by any suitable mobile station (e.g., mobile station 144 or mobile station 146 of FIG. 1), and the mobile station may be configured to execute one or more of these processes at any suitable time. For example, the mobile station may execute the steps of one or more of the processes automatically, by request of the intended base station, periodically (e.g., once every few seconds or minutes), on power-up of the mobile station, or at any other suitable time. It should be understood that the steps shown in these flow diagrams are merely illustrative, and that any of the illustrated steps may be removed, modified, or combined, or any additional steps may be added, without departing from the scope of the present invention.

Referring first to FIG. 6, a simplified flow diagram of process 600 is shown for selecting receive and transmit dimensions. At step 602, the mobile station may identify the strength (e.g., power) of the intended signal compared to that of the interfering signals for each receive dimension. For example, the mobile station can analyze the channel matrix associated with the intended and receive channels, and can compute the SINR of each receive dimension. Then, at step 604, the mobile station can select a subset of the receive dimensions for use in distance-based decoding (e.g., computing LLRs). The mobile station can select, for example, M receive dimensions that have the highest SINR, or the mobile station can select only those receive antennas that have a SINR of at least a predetermined value (e.g., 2 dB, 5 dB, etc.). This may allow the mobile station to choose receive dimensions that have strong intended signals and/or weak interfering signals.

At step 606, the mobile station may determine the effect that each transmit signal vector can have on the receive signal vector. For example, since each column of the channel matrix is associated with a particular transmit dimension, the mobile station can compute the norm of each column of the channel matrix to interpret the overall effect each transmit dimension may have. Then, at step 608, the mobile station can select a subset of the transmit antennas that will be used for distance-based decoding. The mobile station may select, for example, a predetermined number of transmit dimensions having the highest norm, or the mobile station can select only those transmit dimensions that have a norm of a predetermined value. At step 608, the mobile station can perform the distance-based decoding for the intended information using the subset of receive dimensions previously obtained at step 604 and using the subset of transmit dimensions previously obtained at step 608. The mobile station may therefore obtain a log-likelihood ratio or another soft bit metric associated with the received intended information.

Referring now to FIG. 7, a simplified flow diagram of process 700 is shown for adaptively selecting receive dimensions. Process 700 may be a more detailed representation of some of the steps shown in process 600 of FIG. 6. At step 702, the mobile station may perform a variant of a sorted QR operation on the channel matrix. The original sorted QR operation is a modification of the Gram-Schmidt process for decomposing a matrix, but at each step, the column with the largest norm in the null space spanned by the already selected columns is obtained. The mobile station performs the sorted QR process, except that the mobile station selects $$\frac{h_{k,1}}{\|h_{k,1}\|}$$

as the first orthogonal column vector $q_{k,1}$. The variation from the original sorted QR operation allows the mobile station to retain all of the energy of the received signal that corresponds to the intended source, as represented by the channel vector $h_{k,1}$. At the same time, this operation performed at step 702 may arrange the rows of the resulting $R_k$ matrix based on the signal strength of the intended signal.

Then, at step 704, the first row of the $R_k$ matrix is selected, since the first row of this decomposed channel matrix is associated with the intended signal. The remaining rows are associated purely with the interfering sources. Thus, at step 706, to choose the interference channels corresponding to interfering sources with greater power, the mobile station selects rows other than the first row that have a non-zero element larger than a predetermined value. For example, the mobile station may select those rows with a non-zero element greater than $$\frac{\|h_{k,1}\|}{f(S)}.$$

Here, S may be the SINR desired by the mobile station (e.g., 2 dB, 5 dB, etc.), and f can represent any suitable function (e.g., multiplication by a constant).

Moving to step 708, the mobile station forms a reduced $R_k$ matrix, referred to as an $\tilde{R}_k$ matrix, and a reduced $Q_k$ matrix, referred to as a $\tilde{Q}_k$ matrix. These reduced matrices may be formed from the M rows previously selected at steps 704 and 706. For example, $\tilde{R}_k$ may be a sub-matrix of $R_k$, which includes only the selected rows of $R_k$. Thus, the dimension of $\tilde{R}_k$ is M×J. The $\tilde{Q}_k$ matrix may be formed from including only the first M columns of $Q_k$, which produces a matrix of dimension $N_r$×M. This $\tilde{Q}_k$ matrix can be used as the modifying matrix in the distance metric computations of EQ. 15 through EQ. 17 above. Thus, at step 710, the mobile station can compute a log-likelihood ratio or other soft bit metric for the intended signal using the reduced matrices. In some embodiments, the mobile station can compute EQ. 18 and/or EQ. 19 above such that the squared Euclidean distance metrics are computed according to $$DM = \left\| \tilde{Q}_k^* y_k - \tilde{R}_k \begin{bmatrix} x_{k,o_1} \\ \vdots \\ x_{k,o_{J-1}} \\ x_{k,o_J} \end{bmatrix} \right\|^2 \quad \text{(EQ. 26)}$$

where the variables in EQ. 26 are defined above.

Referring now to FIG. 8, a simplified flow diagram of illustrative process 800 is shown for adaptively selecting receive and transmit dimensions for use in decoding for an intended signal. Process 800 may be a more detailed representation of some or all of the steps shown in process 600 of FIG. 6. At step 802, the mobile station calculates the norm of each column of the channel matrix, and at step 804, the mobile station chooses the columns of the channel matrix having a norm greater than a predetermined value. For example, the mobile station may select M columns that have a norm larger than $$\frac{\|h_{k,1}\|}{f(S)},$$

where S may again be the SINR desired by the mobile station (e.g., 2 dB, 5 dB, etc.), and f can again represent any suitable function (e.g., multiplication by a constant).

At step 806, the mobile station may reorder the columns of the channel matrix. More particularly, the mobile station can move the columns with norms larger than the predetermined value to the first M columns of the channel matrix. Then, at step 808, the mobile station may perform QR decomposition on the reordered channel matrix. This may produce square matrix $Q_k$ and upper triangular matrix $R_k$. From these resulting matrices, the mobile station can construct reduced matrices or sub-matrices, $\tilde{Q}_k$ and $\tilde{R}_{k,sq}$, at step 810. For example, the mobile station can construct the $\tilde{Q}_k$ matrix by retaining only the first M columns of $Q_k$. The mobile station can construct the $\tilde{R}_{k,sq}$ matrix by retaining only the first M columns of the $R_k$ matrix to produce $\tilde{R}_k$, and then retaining only M rows of $\tilde{R}_k$.

Using the sub-matrices constructed at step 808, the mobile station can compute log-likelihood ratios for the intended information at step 812. For example, the mobile station can compute EQ. 15 and EQ. 16 above using the $\tilde{Q}_k$ matrix as the $\tilde{U}_k$ sub-matrix. Thus, the Euclidean distance-based metric in EQ. 25 becomes:

$$DM = \left\| \tilde{Q}_k^* y_k - \tilde{R}_{k,sq} \begin{bmatrix} x_{k,o_1} \\ \vdots \\ x_{k,o_{M-1}} \\ x_{k,o_M} \end{bmatrix} \right\|^2 \quad \text{(EQ. 27)}$$

Here, $x_{k,o_1}, \ldots, x_{k,o_M}$ represent the signal components of the transmit signal vector that correspond to the selected columns of the channel matrix. That is, these signal components are a subset of the original transmit dimensions that were selected for use in computing soft information. The mobile station can calculate an LLR using EQ. 18 and/or EQ. 19, or may use the distance metric to compute a soft bit metric in any other suitable form.

Figure 9:
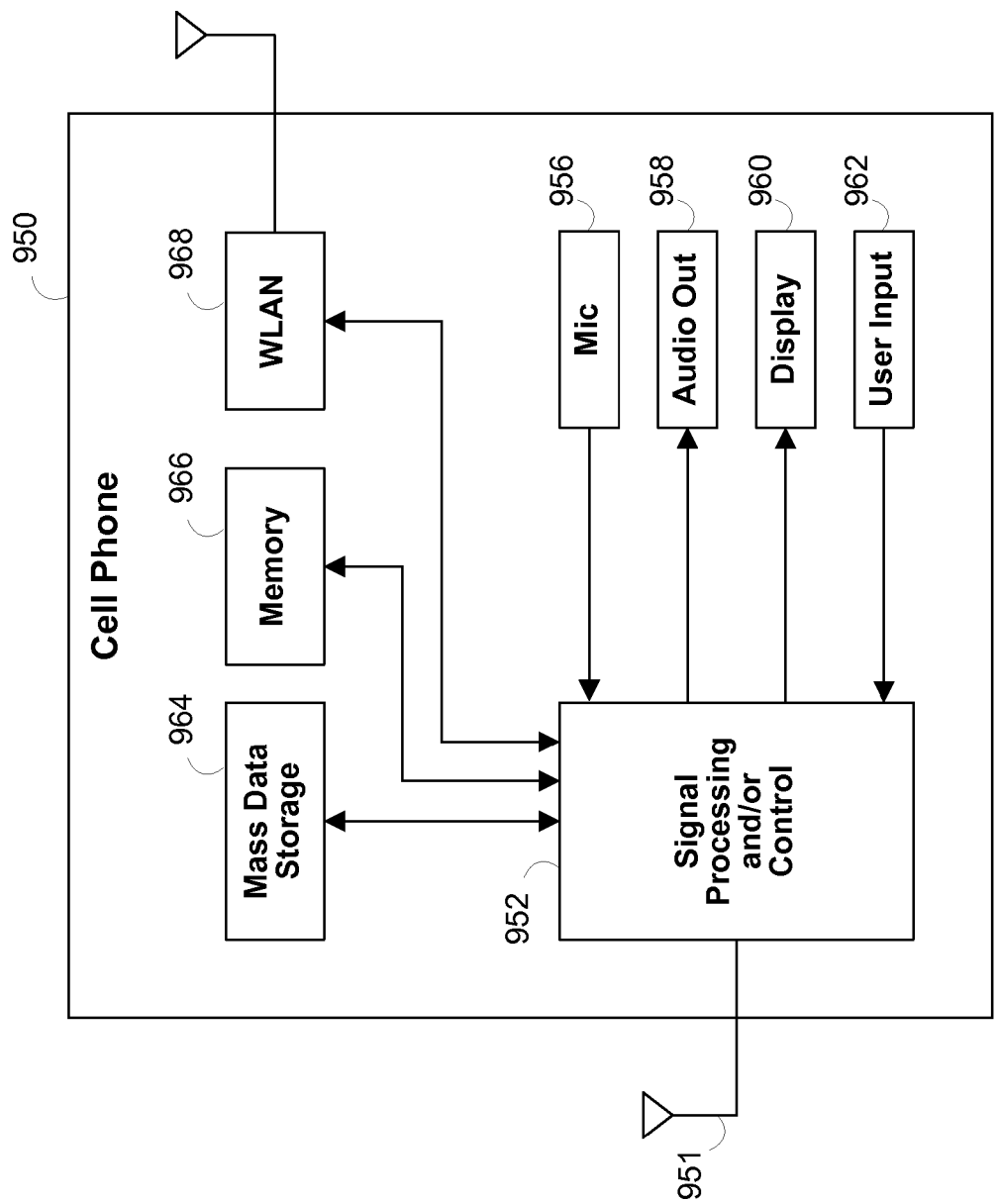
FIG. 9 is a block diagram of an exemplary cell phone that can employ the disclosed technology.
Figure 10:
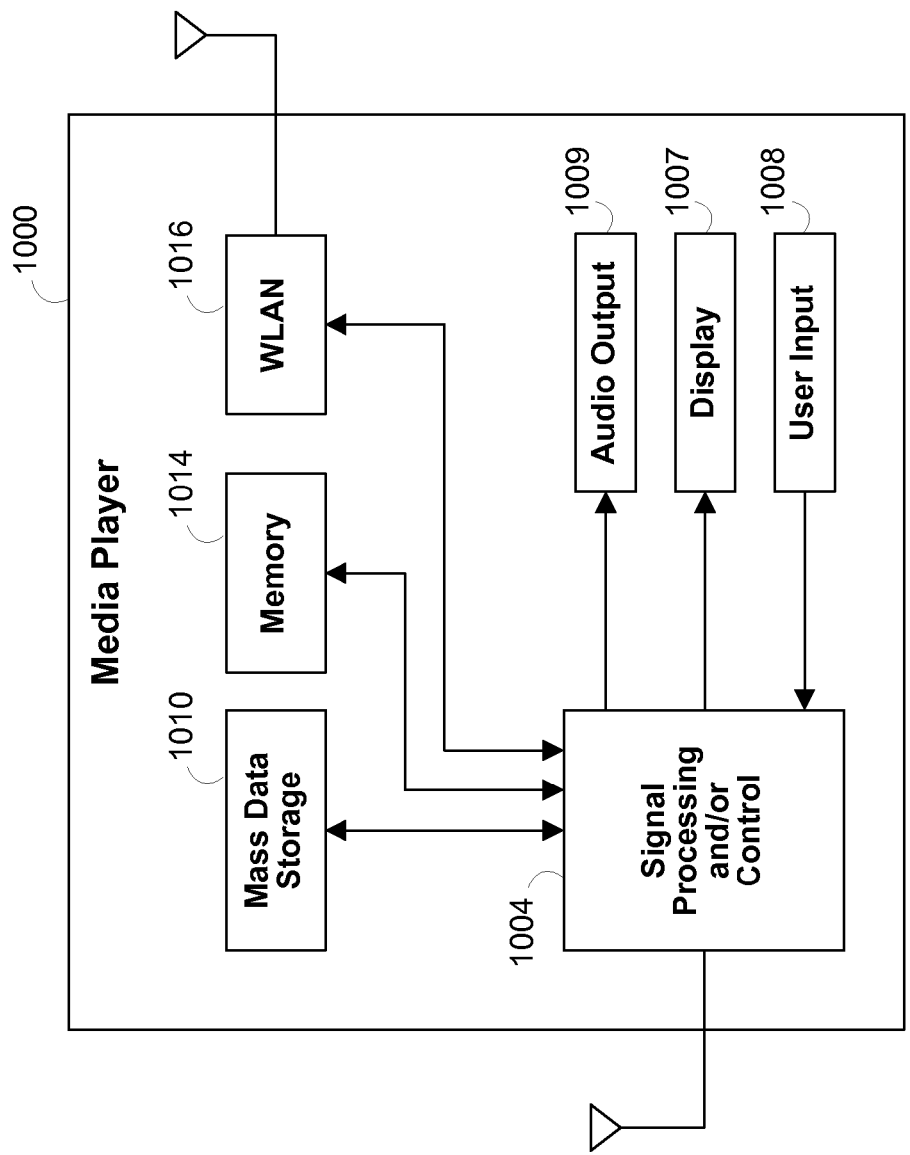
FIG. 10 is a block diagram of an exemplary media player that can employ the disclosed technology.

Referring now to FIGS. 9 and 10, various exemplary implementations of the present invention are shown.

Referring now to FIG. 9, the present invention can be implemented in a cellular phone 950 that may include a cellular antenna 951. The present invention may implement either or both signal processing and/or control circuits, which are generally identified in FIG. 13 at 952, a WLAN network interface 968 and/or mass data storage 964 of the cellular phone 950. In some implementations, the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone functions.

The cellular phone 950 may communicate with mass data storage 964 that stores data in a nonvolatile manner such as optical and/or magnetic storage devices for example hard disk drives and/or DVDs. The HDD may be a mini HDD that includes one or more platters having a diameter that is smaller than approximately 1.8". The cellular phone 950 may be connected to memory 966 such as RAM, ROM, nonvolatile memory such as flash memory and/or other suitable electronic data storage. The cellular phone 950 also may support connections with a WLAN via WLAN network interface 968.

Referring now to FIG. 10, the present invention can be implemented in a media player 1000. The present invention may implement either or both signal processing and/or control circuits, which are generally identified in FIG. 15 at 1004, WLAN network interface 1016 and/or mass data storage 1010 of the media player 1000. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1000 may be connected to memory 1014 such as RAM, ROM, nonvolatile memory such as flash memory and/or other suitable electronic data storage. The media player 1000 also may support connections with a WLAN via WLAN network interface 1016. Still other implementations in addition to those described above are contemplated.

The foregoing describes apparatus and methods for computing soft information at a mobile station having a plurality of receive antennas in the presence of interference. Those skilled in the art will appreciate that the invention can be practiced by other than the described embodiments, which are presented for the purpose of illustration rather than of limitation.

What is claimed is:

1. A method of computing soft information for use in estimating digital information from an intended source, the method comprising:
   receiving, at a receiver, a plurality of data signals with a plurality of different antennas, wherein each of the plurality of data signals includes an intended signal corresponding to the digital information from the intended source and an interference signal from at least one interfering source comprising a plurality of interference sources
   for each respective data signal of the plurality of data signals, comparing, at the receiver, a strength of the intended signal to a strength of the interference signal within the respective data signal;
   selecting, at the receiver, a subset of the plurality of data signals based on the comparisons; computing the soft information corresponding to the digital information using the subset of data signals; selecting a subset of the interference sources; and wherein computing the soft information comprises calculating the soft information using only interference signals received from the subset of the interference sources.

2. The method of claim 1, wherein comparing the strength of the intended signal to the strength of the interference signal within the respective data signal comprises computing a signal-to-interference plus noise ratio (SINR) for the respective data signal.

3. The method of claim 2, wherein selecting a subset of the plurality of data signals comprises selecting each data signal of the plurality of data signals having a SINR of at least a predetermined value.

4. The method of claim 2, wherein selecting a subset of the plurality of data signals comprises selecting a predetermined number of the plurality of data signals having the highest SINR values.

5. The method of claim 1 further comprising:
   computing a receive signal vector and a channel response matrix from the plurality of data signals;
   multiplying the receive signal vector and the channel response matrix by a modifying matrix having dimensions $N_r \times M$ to produce a modified receive signal vector and a modified channel response matrix respectively, where $N_r$ is a number of different antennas used to receive the plurality of data signals, and M is a number of data signals within the subset of data signals.

6. The method of claim 5 further comprising calculating a distance metric based on the modified receive signal vector and the modified channel response matrix.

7. The method of claim 1, wherein each of the plurality of interference sources is associated with a transmit dimension of a channel matrix, and wherein selecting a subset of the interference sources comprises:
   calculating a norm of each transmit dimension of the channel matrix;
   identifying each of the transmit dimensions of the channel matrix that has a norm of at least a predetermined value; and
   selecting each of the plurality of interference sources associated with an identified transmit dimension.

8. The method of claim 1, wherein each of the plurality of interference sources is associated with a transmit dimension of a channel matrix, and wherein selecting a subset of the interference sources comprises:
   calculating a norm of each transmit dimension of the channel matrix;
   identifying the transmit dimensions of the channel matrix that have the highest norms; and
   selecting a predetermined number of the plurality of interference sources associated with the identified transmit dimensions.

9. The method of claim 1, wherein each of the plurality of interference sources is associated with a column of a channel matrix, the method further comprising:
   reordering the columns of the channel matrix with the columns corresponding to the subset of the interference sources at a first position in the channel matrix; and
   performing QR decomposition on the reordered channel matrix.

10. A system for computing soft information to estimate digital information from an intended source, the system comprising:
    a plurality of receive antennas at a receiver operable to:
       receive a plurality of data signals, wherein each of the plurality of data signals includes an intended signal corresponding to the digital information from the intended source and an interference signal from at least one interfering source comprising a plurality of interference sources
    computational logic at the receiver configured to:
       compare, for each respective data signal of the plurality of data signals, a strength of the intended signal to a strength of the interference signal within the respective data signal; and
       select a subset of the plurality of data signals based on the comparisons; wherein the computational logic is further configured to select a subset of the interference sources; and
    a soft bit-metric calculator configured to:
       compute the soft information corresponding to the digital information using the subset of data signals; and wherein the soft bit-metric calculator is further configured to calculate the soft information using only interference signals received from the subset of the interference sources.

11. The system of claim 10, wherein the computational logic is further configured to compute a signal-to-interference plus noise ratio (SINR) for the respective data signal.

12. The system of claim 11, wherein the computational logic is configured to select a subset of the plurality of data signals by selecting each data signal of the plurality of data signals having a SINR of at least a predetermined value.

13. The system of claim 11, wherein the computational logic is configured to select a subset of the plurality of data signals by selecting a predetermined number of the plurality of data signals having the highest SINR values.

14. The system of claim 10, wherein the computational logic is further configured to:
    compute a receive signal vector and a channel response matrix from the plurality of data signals;
    multiply the receive signal vector and the channel response matrix by a modifying matrix having dimensions $N_r \times M$ to produce a modified receive signal vector and a modified channel response matrix respectively, where $N_r$ is a number of different antennas used to receive the plurality of data signals, and M is a number of data signals within the subset of data signals.

15. The system of claim 14, wherein the soft bit-metric calculator is further configured to calculate a distance metric based on the modified receive signal vector and the modified channel response matrix.

16. The system of claim 10, wherein each of the plurality of interference sources is associated with a transmit dimension of a channel matrix, and wherein the computational logic is configured to select a subset of the interference sources by:
- calculating a norm of each transmit dimension of the channel matrix;
- identifying each of the transmit dimensions of the channel matrix that has a norm of at least a predetermined value; and
- selecting each of the plurality of interference sources associated with an identified transmit dimension.

17. The system of claim 10, wherein each of the plurality of interference sources is associated with a transmit dimension of a channel matrix, and wherein the computational logic is configured to select a subset of the interference sources by:
- calculating a norm of each transmit dimension of the channel matrix;
- identifying the transmit dimensions of the channel matrix that have the highest norms; and
- selecting a predetermined number of the plurality of interference sources associated with the identified transmit dimensions.

18. The system of claim 10, wherein each of the plurality of interference sources is associated with a column of a channel matrix, the computational logic further configured to:
- reorder the columns of the channel matrix with the columns corresponding to the subset of the interference sources at a first position in the channel matrix; and
- perform QR decomposition on the reordered channel matrix.

* * * * *